(12) United States Patent
Zumbusch

(10) Patent No.: US 7,165,396 B2
(45) Date of Patent: Jan. 23, 2007

(54) PUMP CONTROL OVERRIDE FOR TANDEM PUMPS

(75) Inventor: Steven J. Zumbusch, Chanhassen, MN (US)

(73) Assignee: Eaton Corporation, Cleveland, OH (US)

( * ) Notice: Subject to any disclaimer, the term of this patent is extended or adjusted under 35 U.S.C. 154(b) by 499 days.

(21) Appl. No.: 10/618,417

(22) Filed: Jul. 11, 2003

(65) Prior Publication Data

US 2005/0008498 A1    Jan. 13, 2005

(51) Int. Cl.
*F04B 49/22*    (2006.01)
*F16D 31/02*    (2006.01)

(52) U.S. Cl. .......................................... 60/430; 60/486
(58) Field of Classification Search .................. 60/430, 60/452, 486; 417/216
See application file for complete search history.

(56) References Cited

U.S. PATENT DOCUMENTS 3,941,514 A * 3/1976 Louis et al. ................. 417/216
3,985,472 A * 10/1976 Virtue et al. ................. 417/216
4,936,095 A    6/1990 Ross et al. ..................... 60/444
6,082,107 A *  7/2000 Schniederjan et al. ......... 60/452
6,109,030 A *  8/2000 Geringer ....................... 60/452
6,170,261 B1 * 1/2001 Ishizaki et al. ............... 60/430

* cited by examiner

*Primary Examiner*—Thomas E. Lazo
(74) *Attorney, Agent, or Firm*—Jarrett D. Millar; L. J. Kasper

(57) ABSTRACT

A tandem pump assembly of the type including a housing (H), disposed in which is a first pump (11), driven by an input shaft (19), and a second pump (33), also driven by the input shaft (19). The assembly is characterized by the tandem pump assembly including pressure override valve means (71,73) associated with only the first pump (11), and operable, in response to a fluid pressure at a fluid outlet port (35) in excess of a pressure override setting (79), to communicate pressurized fluid to a first fluid pressure responsive means (31), in a manner tending to decrease the displacement of the first pump (11) without effecting the displacement of the second pump (33), until said fluid pressure is substantially equal to the pressure override selling (79), even if it is necessary for the first pump (11) to go over-center from its initial displacement.

6 Claims, 2 Drawing Sheets

PUMP CONTROL OVERRIDE FOR TANDEM PUMPS

BACKGROUND OF THE DISCLOSURE

The present invention relates to variable displacement hydrostatic pumps and displacement varying controls therefor, and more particularly, to such pumps which are of the "tandem" pump type.

Although the present invention may be utilized with variable displacement hydrostatic pumps of different types (i.e., wherein the actual pumping element or "rotating group" can be any one of several different types), the present invention is especially adapted for use with axial piston pumps of the "swashplate" type (or the swash and cradle type), and will be described in connection therewith.

A typical variable displacement axial piston pump, especially of the type used in mobile applications, includes some sort of operator-controlled input device, such as a joy stick or manually operable handle. By means of such an input, the operator can change the tilt angle of the swashplate, thus varying the displacement of the pump (i.e., the volume of fluid pumped per revolution of the input shaft). Typically, the actual movement of the swashplate on such a pump is accomplished by a fluid pressure responsive device, such as a servo-piston, or a pair of servo-cylinders. In either case, when the operator moves the input control, the result is that control pressure (normally the outlet pressure from the charge pump) is communicated to the fluid pressure operated device to either increase or decrease the tilt angle of the swashplate, depending upon the direction of movement of the input control.

Within the mobile hydraulics industry, there is a certain range of sizes (pump displacements) for axial piston pumps which has become the standard within the industry. For example, there are the relatively smaller axial piston pumps having displacements in the range of about 2.0 to about 3.0 cubic inches per revolution, and there are the relatively larger axial piston pumps having displacements in the range of about 7.0 to about 9.0 cubic inches per revolution. Therefore, each manufacturer of axial piston pumps provides a pump model corresponding to the relatively smaller displacement noted above, a pump model corresponding to the relatively larger displacement noted above, and a number of models in between the two displacement extremes, as described above. The various axial piston pump models offered by each manufacturer satisfy the vast majority of the mobile application requirements for such pumps. However, there are occasionally vehicle applications which require a pump having a substantially larger displacement than the largest size normally available for mobile hydraulic uses.

In order to meet the occasional, relatively lower volume applications which require much larger pump displacements, those skilled in the art have developed "tandem" pumps in which a single pump assembly houses two separate (but typically identical) axial piston rotating groups, both driven by a single, common input shaft (which also drives the charge pump, as is well known to those skilled in the art).

Although such tandem pumps can be plumbed in several different ways, and the present invention could be utilized in connection with practically any type of tandem pump, it is especially suited for use in connection with a tandem pump in which the output flows of the two rotating groups are combined, and communicated to a single load (e.g., a hydraulic motor), as opposed to the situation in which the output flow of each rotating group is utilized by a different load. Therefore, the present invention will be described in connection with, and is preferably used with, a tandem pump having both rotating groups communicated to a common pump outlet port.

It has been common practice in the tandem pumps sold commercially, prior to the present invention, to include with each of the pumping elements (the "rotating groups") all of the various pump control features required for operation of the pump. For example, if the tandem pump requires, as is normally the case, a high pressure relief valve and check valve assembly, it has been common practice to include such an assembly in the end cap of each of the axial piston rotating groups, such that the overall tandem pump assembly actually is provided with two sets of high pressure relief valves and check valves. Among the pump controls commonly required for tandem pumps is some sort of internal pressure override (IPOR) control, by means of which an excessive load pressure will result in a reduction in the pump displacement (i.e., a reduction in the tilt angle of the swashplate).

Although there is generally no functional disadvantage in providing a tandem pump assembly with redundant pump controls, such redundancy does add substantially to the overall cost of the tandem pump and in most cases may also be-undesirable in terms of packaging, weight, and the overall size of the tandem pump assembly.

BRIEF SUMMARY OF THE INVENTION

Accordingly, it is an object of the present invention to provide an improved tandem pump assembly which overcomes the above-described shortcomings of the prior art.

It is a more specific object of the present invention to provide such an improved tandem pump assembly which has the various pump displacement controls required for satisfactory performance, but at a substantially reduced cost, and with improved packaging and reduced weight for the overall tandem pump assembly.

The above and other objects of the invention are accomplished by the provision of a tandem pump assembly of the type including a housing defining a fluid inlet port and a fluid outlet port. A first pump is disposed in the housing and driven by an input shaft, the first pump comprising a variable displacement, over-center pump, including first fluid pressure responsive means for varying the displacement of the first pump in response to the porting of a control pressure. The first pump has an inlet in fluid communication with the fluid inlet port, and an outlet in fluid communication with the fluid outlet port. A second pump is disposed in the housing and is driven by the input shaft. The second pump has an inlet in fluid communication with the fluid inlet port and an outlet in fluid communication with the fluid outlet port.

The improved tandem pump assembly is characterized by the assembly including pressure override valve means associated with only the first pump, and operable, in response to a fluid pressure at the fluid outlet port in excess of a pressure override setting, to communicate pressurized fluid to the first fluid pressure responsive means, in a manner tending to decrease the displacement of the first pump, without effecting the displacement of the second pump, until the fluid pressure at the fluid outlet port is substantially equal to the pressure override setting.

In response to a more limited aspect of the present invention, the displacement of the first pump may be decreased until the first pump reaches a neutral (zero) displacement condition and, if the fluid pressure at said fluid outlet port is still in excess of the pressure override setting, the displacement of the first pump may go over-center (thus reversing direction of flow from the first pump) until the fluid pressure at the fluid outlet port is brought down to the level of the pressure override setting.

DETAILED DESCRIPTION OF THE PREFERRED EMBODIMENT

Figure 1:
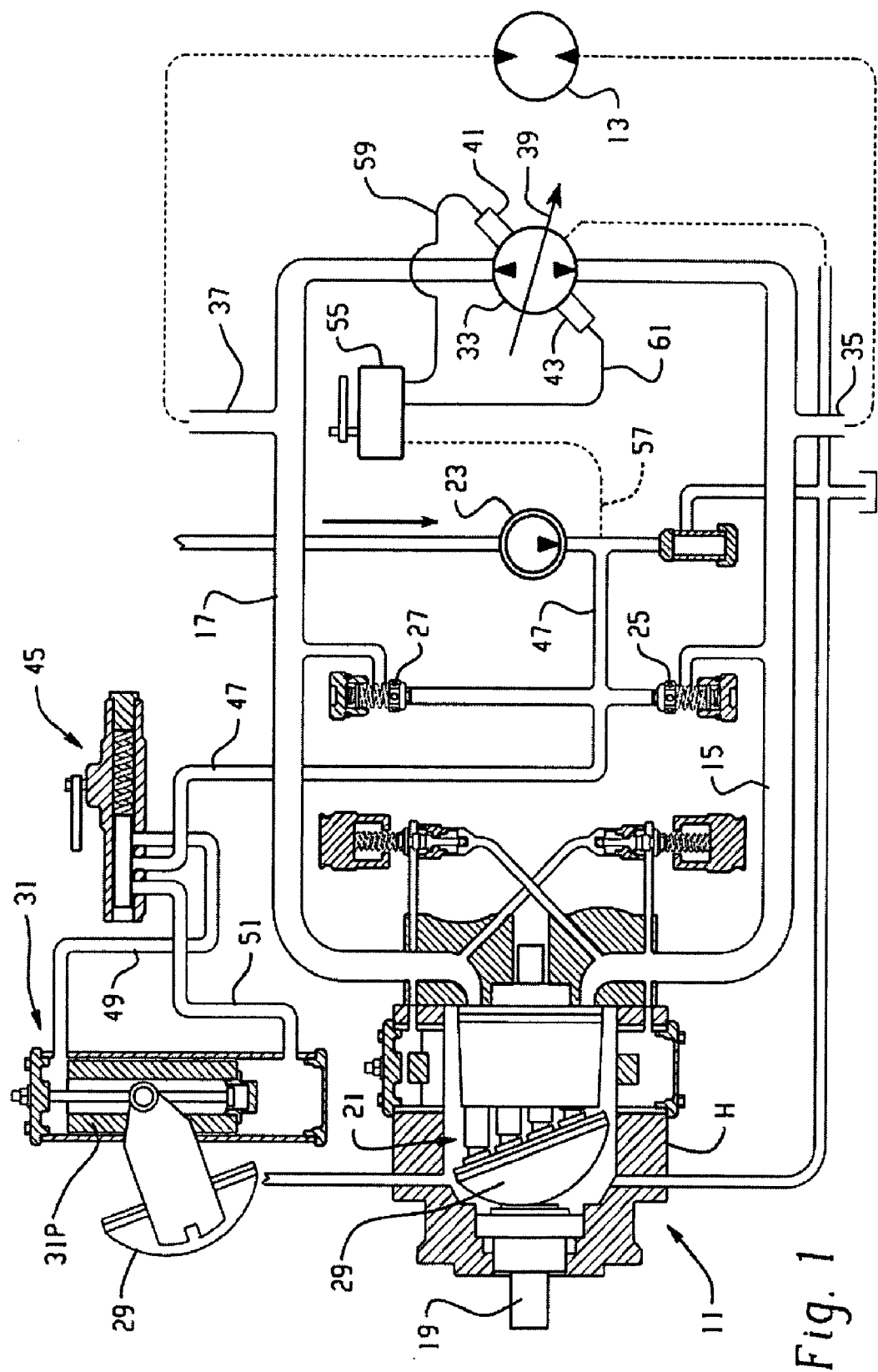
FIG. 1 is an illustration, partly in schematic and partly in cross-section, of a system including a tandem pump assembly made in accordance with the present invention.

Referring now to the drawings, which are not intended to limit the invention, FIG. 1 illustrates a tandem pump assembly made in accordance with the present invention. The tandem pump assembly of FIG. 1 includes a first variable displacement axial piston pump, of the over-center type, generally designated 11, hydraulically coupled to a fixed displacement motor 13 (or to any other hydraulic load) partly by means of a pair of fluid conduits 15 and 17. The axial piston pump 11 may be of a well-known type, including an input shaft 19, which provides the input drive to a rotating group, generally designated 21, as well as to a charge pump 23. As is well known to those skilled in the art, the output of the charge pump 23 is the primary source for make-up fluid either to conduit 15, through a relief and check valve assembly 25, or to conduit 17, through a relief and check valve assembly 27. As is also well known to those skilled in the art, the output of the charge pump 23 is communicated to whichever of the conduits 15 or 17 is at the lower fluid pressure.

Figure 2:
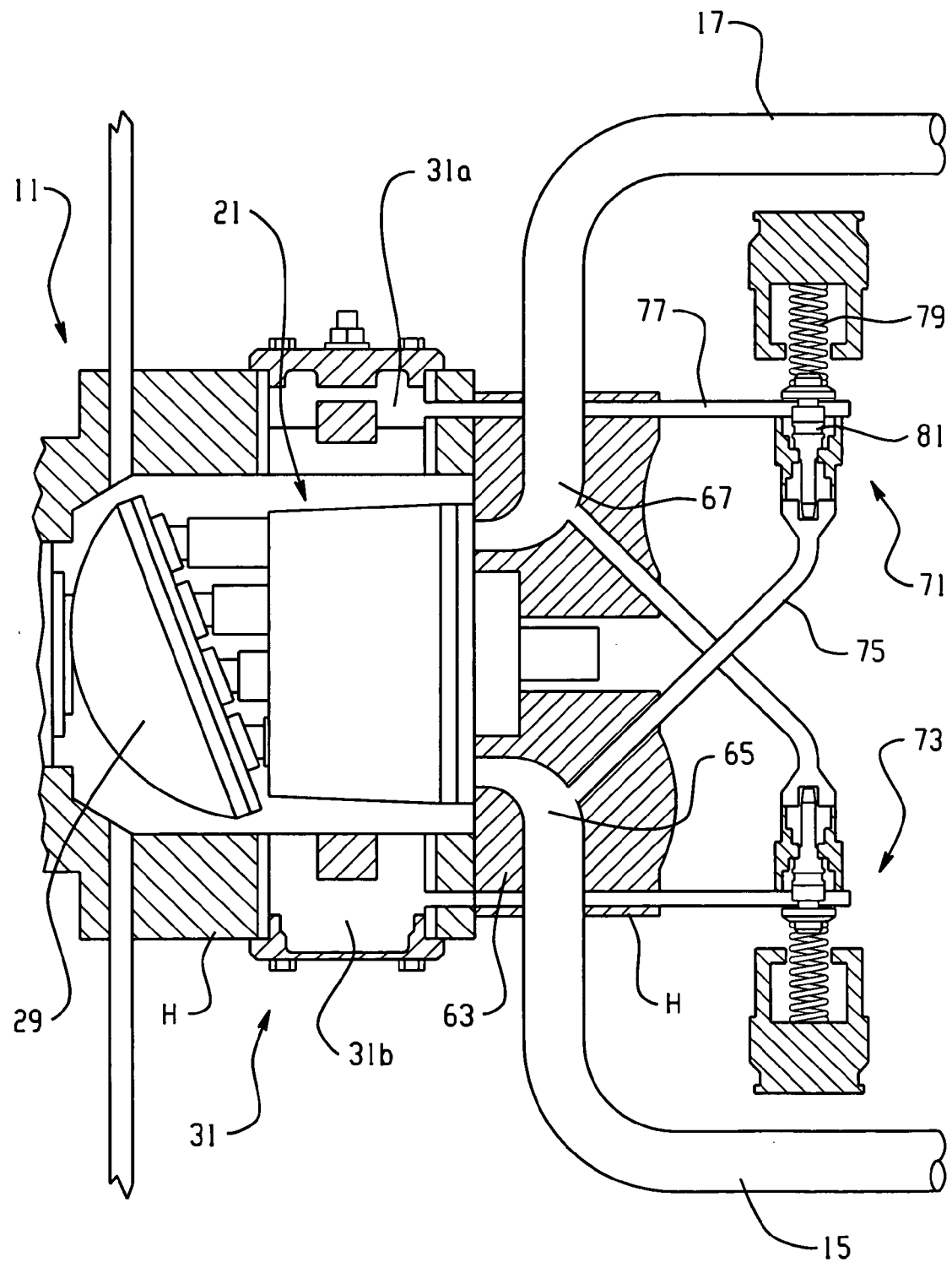
FIG. 2 is a fragmentary, axial cross-section of the pressure override valve means which comprises one aspect of the present invention.

The pump 11 further includes a swashplate 29 which is tiltable to vary the displacement of the pump, by means of a servo-piston assembly, generally designated 31, as is now well known in the art, including a moveable servo piston 31P. It should be noted that, in FIG. 1, the swashplate 29 and servo-piston assembly 31 are illustrated both inside the pump 11, and separately therefrom (above the pump 11 in FIG. 1), for ease of illustration. Although the servo-piston assembly 31 is illustrated herein as a single piston within a cylinder (having pressure chambers 31a and 31b at either end thereof, as shown in FIG. 2), it is also well known to those skilled in the art to vary the displacement of the swashplate 29 by means of a pair of separate stroking cylinders, one disposed to tilt the swashplate in one direction (corresponding to forward in a propel application) and the other stroking cylinder being disposed to tilt the swashplate in the opposite direction (corresponding to reverse). References hereinafter, and in the appended claims, to "fluid pressure responsive means" for varying the displacement of a pump will be understood to mean and include either of the arrangements described hereinabove, or any similar, functionally equivalent arrangement for varying the displacement of the swashplate 29 in response to a fluid pressure ("control" or "servo" pressure).

Referring still primarily to FIG. 1, the tandem pump assembly, in the subject embodiment, also includes a second variable displacement axial piston pump 33 which is connected, hydraulically, in parallel with the pump 11, such that when the inlet of the pump 11 is in fluid communication with the fluid conduit 17, the inlet of the pump 33 is also in fluid communication with the fluid conduit 17. Similarly, when the outlet of the pump 11 is in fluid communication with the fluid conduit 15, the outlet of the pump 33 is also in fluid communication with the fluid conduit 15. As was noted previously, and for purposes of subsequent description, the rotating groups of both of the pumps 11 and 33 are being driven by the input shaft 19 such that the fluid conduit 15 is the high pressure conduit, and is connected to a fluid outlet port of the tandem pump, as represented schematically in FIG. 1 by a conduit 35. The tandem pump assembly also includes a fluid inlet port, as represented schematically by a conduit 37.

Although not an essential feature of the present invention, typically, the second pump 33 would be substantially identical to the pump 11 in terms of including a rotating group (not shown in the schematic of the pump 33), just like the rotating group 21 of the pump 11, with the displacement of the pump 33 being controlled by the tilt angle of a swashplate 39. Normally, in commercially available tandem pump assemblies, the two pumps (11 and 33) are of not only the same general construction, but also, the same displacement (flow volume per revolution of input shaft 19). Also, it is typical to enclose both of the pump assemblies, i.e., both the pump 11 and the pump 33 within a common housing structure or assembly, designated herein as "H" in both of FIGS. 1 and 2.

Typically, although not essential, the second pump 33 would also include the same general type of "pressure responsive means" for varying the displacement of the pump, i.e., the tilt angle of the swashplate 39. Therefore, in FIG. 1 there is illustrated schematically a pair of stroking cylinders 41 and 43, corresponding to the pressure chambers 31a and 31b at the opposite ends of the servo-piston assembly 31. As was noted previously, the details of the construction of either the servo-piston assembly or the stroking cylinders are not essential features of the invention.

As is well known to those skilled in the art, the fluid pressure communicated to the servo-piston assembly 31, and therefore, the displacement of the swashplate 29, may be determined by a manually operated main control valve, generally designated 45. In the subject embodiment, and by way of example only, the main control valve 45 is made in accordance with the teachings of U.S. Pat. No. 4,050,247, assigned to the assignee of the present invention and incorporated herein by reference. Control fluid pressure from the charge pump 23 is communicated by a conduit 47 to the control valve 45, which then directs control pressure to either the upper pressure chamber 31a of the servo-piston assembly 31, by means of a conduit 49, or to the lower pressure chamber 31b, by means of a conduit 51, all of which is now well known to those skilled in the art.

In a similar manner, the fluid pressure in the stroking cylinders 41 and 43 and therefore, the displacement of the swashplate 39 is determined by a manually operated main control valve, generally designated 55, which is also preferably made in accordance with the teachings of the above-incorporated U.S. Pat. No. 4,050,247, and preferably, would be substantially identical to the control valve 45. Control pressure from the charge pump 23 is communicated by a conduit 57 through the control valve 55 and from there to either the stroking cylinder 41 by means of a conduit 59 or to the stroking cylinder 43 by means of a conduit 61.

Those skilled in the art of tandem pumps will understand that each of the control valves 45 and 55 may have its own separate manual input handle, but with the two handles "ganged" together for movement in unison, such that the operator is required to move only one of the handles, but with the result that both move together. Alternatively, there may be provided a single, separate manual input, to be controlled by the operator, with appropriate linkage to each of the control valves 45 and 55. It should be understood by those skilled in the art that the present invention is not limited to any particular arrangement for providing the input control movement to vary the displacement of the two pumps (11 and 33) of the tandem pump assembly.

Referring now to FIG. 2, in conjunction with FIG. 1, one important aspect of the tandem pump assembly of the present invention will be described. As is shown somewhat schematically and fragmentarily in FIG. 2, the first pump 11 includes an end cap 63, which may be configured in the manner of the pumps sold commercially by the assignee of the present invention. The end cap 63 defines an outlet 65 and an inlet 67 which are in communication with the fluid outlet port 35 and the fluid inlet port 37, respectively, of the tandem pump assembly. Typically, the fluid ports 35 and 37 would both be defined by the common housing assembly H, although the construction details of such are not shown herein.

Referring now primarily to FIG. 2, the pump 11 is provided with a pair of internal pressure override (IPOR) valves 71 and 73. In the subject embodiment, and by way of example only, the IPOR valves 71 and 73 are physically disposed within the end cap 63 (although shown as being separate therefrom schematically, for ease of illustration). Also, the IPOR valves 71 and 73 are preferably identical to each other, thus being readily interchangeable, during the assembly of the pump. For purposes of the subsequent description, only the IPOR valve 71 and its function will be described, recognizing that the IPOR valve 73 would operate in the same manner, if the direction of rotation of the input shaft 19 were reversed.

The endcap 63 includes a fluid passage 75, in open fluid communication with the outlet 65, such that, with the input shaft 19 rotating in its normal, "forward" direction, high pressure fluid is communicated by the rotating group 21 to the outlet 65, and from there, by means of the fluid conduit 15 to the fluid outlet port 35, as was described previously. Therefore, high pressure (or "system" pressure) is present in the fluid passage 75 under normal operating conditions.

The endcap 63 also has a fluid passage 77 in open communication with the upper pressure chamber 31a of the servo piston assembly 31. The IPOR valve 71 includes a biasing spring 79 which biases a valve member 81 toward its closed position as shown in FIG. 2. Typically, the biasing force of the spring 79 may be set or adjusted to exert a closing force on the valve member 81 corresponding to a predetermined, desired pressure override setting. For example, the spring 79 could be set such that, as long as the pump outlet pressure (i.e., the pressure in the outlet 65 and in the fluid passage 75) is below 6000 psi, the valve member 81 remains in its closed position of FIG. 2, and the pump operates in the normal manner.

Assume now, for purposes of further explanation, that an input has been provided to both of the main control valves 45 and 55, such that the swashplates 29 and 39 are both displaced to the nearly maximum displacement position (for example, about 15 to about 18 degrees) as is shown for the swashplate 29 in FIG. 2. In accordance with an important aspect of the present invention, if the pressure at the fluid outlet port 35 of the tandem pump assembly begins to increase beyond the 6000 psi pressure override setting of the IPOR valve 71, the valve member 81 will unseat, in opposition to the biasing force of the spring 79, permitting a small amount of pressurized fluid to flow from the fluid passage 75 past the valve member 81 and then through the fluid passage 77 to the upper pressure chamber 31a of the servo piston assembly 31.

In accordance with another important aspect of the invention, it should be noted that, although the second pump 33 may be nearly identical to the first pump 11, one difference (for purposes of the invention) is that the second pump 33 does not include any IPOR valves. Therefore, in the operating scenario described in the preceding paragraph, as the pressurized fluid is communicated from the outlet 65 through the IPOR valve 71, to the upper pressure chamber 31a, the result is that the piston 31P within the servo piston assembly 31 is forced somewhat downward, in FIG. 2, which, as may be seen in FIG. 1, will have the result of changing the tilt of the swashplate 29 from its displacement, as shown in FIGS. 1 and 2, toward a "decreased" displacement. In many operating situations, just a slight decrease (perhaps two or three fewer degrees of tilt angle of the swashplate 29) would be enough to reduce the pressure in the outlet 65, conduit 15 and outlet port 35 to a level at least somewhat below the 6000 psi pressure override setting.

It should be understood by those skilled in the art, based upon a reading and understanding of this specification, that while the decrease in the tilt angle of swashplate 29 is occurring, as described, no change in the tilt angle of the swashplate 39 is occurring (assuming that no change in the manual input to the tandem pump assembly is occurring). Thus, although in general, the manual input to both of the pumps 11 and 33 is the same, and the displacement of the pumps is initially and normally the same, in the "pressure override" scenario described above, the displacement of the first pump 11 decreases to a displacement less than that of the second pump 33. The above-described decrease in the displacement of the pump 11, with no corresponding decrease in the displacement of the pump 33, is one important aspect of the present invention.

Assuming now, for purposes of further explanation of the present invention, that the vehicle operator is attempting to move a load which would require a fluid pressure at the fluid outlet port 35 well above the pressure override setting, the operation of the invention will be as follows: As the pressure in the outlet 65 rises above the 6000 psi pressure override setting, thus opening the valve member 81 as was described previously, pressurized fluid is communicated into the upper pressure chamber 31a, as was described previously. However, because of the excessive load imposed on the motor 13, moving the servo piston 31P down somewhat in FIG. 2 to decrease the tilt angle of the swashplate 29 does not immediately reduce the pressure in the outlet 65 below the pressure override setting. In that situation, the IPOR valve 71 remains open, continuing to communicate pressurized fluid into the upper pressure chamber 31a, and continuing to "decrease" the tilt angle of the swashplate 29 toward its neutral condition (i.e., in which the swashplate is vertical or perpendicular to the axis of the input shaft 19).

If the load on the motor 13 is such that, even when the swashplate 29 reaches its neutral condition, the pressure at the fluid outlet port 35 is still in excess of the 6000 psi pressure override setting, the IPOR valve 71 will continue to operate, and the tilt angle of the swashplate 29 will continue to "decrease". Therefore, it will be understood by those skilled in the art, based upon the present specification, that references herein, and in the appended claims, to the swashplate 29 of the first pump "decreasing" will be understood to mean and possibly include both (a) decreasing from some predetermined displacement toward a neutral condition; and (b) continuing to move in the same rotational direction, from the neutral condition, toward an increasing displacement, but at the opposite tilt angle.

Therefore, if necessary, in order to reduce the tandem pump outlet pressure below the pressure override setting, the swashplate 29 of the first pump 11 will decrease from the position shown in FIG. 2 to a neutral condition (moving clockwise in FIG. 2) and then will continue to pivot clockwise beyond neutral, such that the outlet 65 will now serve as the pump inlet, and the inlet 67 will now serve as the pump outlet. When this condition occurs, the first pump 11 is actually "absorbing" energy by receiving (at what is now its inlet), the pressure output of the second pump 33, flowing through the fluid conduit 15. Thus, the tilt angle of the swashplate 29 will continue to "decrease", as that term was defined above, until the pressure at the fluid outlet port 35 of the tandem pump assembly stabilizes at a pressure below the pressure override setting.

In accordance with another aspect of the invention, and referring again primarily to FIG. 1, it may be seen that the relief and check valve assemblies 25 and 27, mentioned previously, are provided in conjunction with only the first pump 11. Typically, the relief and check valve assemblies 25 and 27 would also be disposed within the endcap 63, as are the IPOR valves 71 and 73. Therefore, in the case of the second pump 33, which would normally also include an endcap similar to the endcap 63, the endcap for the second pump 33 could be made simpler and less expensive, because there would now be no need to core and machine various passages, and ports, etc. to accommodate either IPOR valve assemblies or relief and check valve assemblies. In addition, and even more importantly, the manufacturing cost (or purchased part cost) of two IPOR valves and two relief and check valve assemblies would be eliminated.

It should be apparent to those skilled in the art, from a reading and understanding of the present specification, that, because of the parallel hydraulic connection of the first and second pumps (11 and 33) within the common housing assembly H of the tandem pump assembly, the relief and check valve assemblies 25 and 27 in the endcap 63 of the first pump 11 will provide all of the necessary circuit protection functions. Therefore, if for any reason, the high pressure (system pressure) conduit (i.e., conduit 15 in the previous example) contains fluid pressure in excess of the relief setting, that excess pressure will be cross-ported to the low pressure conduit (conduit 17 in the example). Or, if the fluid pressure in the low pressure conduit drops below charge pressure (typically about 200–400 psi) from the charge pump 23, charge pressure will be communicated from the pump 23 past the associated relief and check valve assembly into the low pressure conduit, as is well known to those skilled in the art.

It will be appreciated by those skilled in the art of hydraulic pumps that there is great commercial desirability in the ability to provide a tandem pump assembly, which effectively doubles the pump output capability of either of the pumps (11 or 33) individually, but wherein the various pump displacement controls (i.e., those of the "cross-port" type) are provided at essentially the same total cost as would be required for just one pump individually.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A tandem pump assembly of the type including a housing defining a fluid inlet port and a fluid outlet port; a first pump disposed in said housing and driven by an input shaft, said first pump comprising a variable displacement, over-center pump, including first fluid pressure responsive means for varying the displacement of said first pump in response to the porting of a control pressure, said first pump having an inlet in fluid communication with said fluid inlet port, and an outlet in fluid communication with said fluid outlet port; a second pump disposed in said housing and driven by said input shaft, said second pump having an inlet in fluid communication with said fluid inlet port, and an outlet in fluid communication with said fluid outlet port; characterized by:

(a) said tandem pump assembly including only one pressure override valve means associated with said fluid outlet port, and operable, in response to a fluid pressure at said fluid outlet port in excess of a pressure override setting, to communicate pressurized fluid to said first fluid pressure responsive means, in a manner tending to decrease the displacement of said first pump without effecting the displacement of said second pump, until said fluid pressure is substantially equal to said pressure override setting.

2. A tandem pump assembly as claimed in claim 1, characterized by said first pump comprising an axial piston pump having a tiltable swashplate, and said first fluid pressure responsive means is operable to vary the tilt angle of said swashplate in response to variations in said control pressure.

3. A tandem pump assembly as claimed in claim 1, characterized by said first fluid pressure responsive means comprising a servo control cylinder including a piston biased by said control pressure toward a position corresponding to increased displacement of said first pump.

4. A tandem pump assembly as claimed in claim 3, characterized by said pressure override valve means including one internal pressure override valve having its inlet in fluid communication with said outlet of said first pump, said internal pressure override valve having its outlet in fluid communication with said servo control cylinder to communicate said pressurized fluid thereto to bias said piston in a direction opposite the direction in which said piston is biased by said control pressure.

5. A tandem pump assembly as claimed in claim 1, characterized by a single relief valve assembly having a relief setting, said relief valve assembly being operable, in response to a fluid pressure at said fluid outlet port in excess of said relief setting, to communicate pressurized fluid from said fluid outlet port to said fluid inlet port, until said fluid pressure is substantially equal to said relief setting.

6. A tandem pump assembly as claimed in claim 1, characterized by said second pump comprising a variable displacement pump including second fluid pressure responsive means for varying the displacement of said second pump in response to the porting of said control pressure.

* * * * *